Patented Aug. 11, 1953

2,648,690

UNITED STATES PATENT OFFICE 2,648,690

PROCESS FOR THE PREPARATION OF 4-(ACYLSULFAMYL) DERIVATIVES OF ANILIC ACIDS

Evan J. Young, Valley Park, Mo., assignor to Monsanto Chemical Company, St. Louis, Mo., a corporation of Delaware No Drawing. Application December 22, 1950, Serial No. 202,415

11 Claims. (Cl. 260—397.7)

This invention relates to an improved process for the preparation of 4-(acylsulfamyl) derivatives of anilic acid which may be represented by the following formula

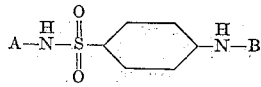

wherein A represents an acyl radical derived from an aliphatic monocarboxylic acid and B represents a monoacyl radical derived from a dicarboxylic acid.

The above described derivatives have widespread utility as pharmaceuticals. Heretofore, they have been prepared by reacting an $N^1$-acylsulfanilamide, wherein the acyl radical is derived from an aliphatic monocarboxylic acid, with a dicarboxylic acid anhydride in an alcohol solution or other inert solvent. In general, this reaction did not proceed satisfactorily as a result of which the yield of the desired anilic acid derivative was relatively low and the product had to be submitted to difficult purification procedures to eliminate unreacted products and highly colored by-products. It is an object of this invention, therefore, to provide an improved process for the preparation of the above described 4-(acylsulfamyl) derivatives of anilic acids by the reaction of an $N^1$-acylsulfanilamide and a dicarboxylic acid anhydride.

It has now been discovered that highly improved yields of these derivatives as hereinbefore described may be obtained by reacting an $N^1$-acylsulfanilamide wherein the acyl radical is derived from an aliphatic monocarboxylic acid and a dicarboxylic acid anhydride in a ketone selected from the group consisting of acetone and 2-butanone. It has further been found that from the reaction mixture obtained in accordance with the novel process of this invention, the anilic acid derivative may conveniently be recovered in a substantially pure state as a white crystalline material having no foreign odor and substantially free of any highly colored side reaction products. The following examples are illustrative of the novel process of this invention, wherein all parts are by weight unless otherwise noted:

EXAMPLE I

4'-(acetylsulfamyl) phthalanilic acid

To a solution of 53.6 parts (0.25 mol) of $N^1$-acetyl sulfanilamide in 400 parts of acetone was added 40 parts (0.28 mol) of phthalic anhydride while maintaining a temperature of 42° C. With constant agitation the resultant solution was boiled under reflux conditions (57° C.) for approximately two hours, after which time the excess acetone was removed by distillation until a thick paste remained. To this reaction mass 800 parts of water were then added and the resultant slurry filtered. The filter cake was washed several times with water and then dried by heating to a temperature of 105° C. 86 parts of 4'-(acetylsulfamyl) phthalanilic acid were thus obtained, representing a 96% yield. The 4'-(acetylsulfamyl) phthalanilic acid thus obtained was a white crystalline material, free from foreign odor and having a melting point of 197–198° C.

EXAMPLE II

4'-(acetylsulfamyl) phthalanilic acid

The procedure set forth in Example I was repeated using in place of the acetone, 2-butanone. The 4'-(acetylsulfamyl) phthalanilic acid thus obtained is comparable in yield and quality to that obtained in Example I.

EXAMPLE III

4-(acetylsulfamyl) succinanilic acid

In accordance with the procedure described in Example I, an excellent yield of substantially pure 4-(acetylsulfamyl) succinanilic acid is obtained utilizing 53.6 parts of $N^1$-acetylsulfanilamide, 28 parts of succinic anhydride and 400 parts of acetone.

EXAMPLE IV

4-(propionylsulfamyl) adipanilic acid

Utilizing 57 parts of $N^1$-propionylsulfanilamide, 36 parts of adipic anhydride and 400 parts of 2-butanone in accordance with the procedure described in Example I, an excellent yield of substantially pure 4-(propionylsulfamyl) adipanilic acid is obtained.

While specific reactants, quantities of reactants and reaction conditions have been set forth in the preceding examples, it will be obvious to those skilled in the art that such factors may be subject to substantial variation. For example, the temperature maintained during the reaction may be varied over a wide range, limited only by the freezing point and the boiling point of the reaction mixture. Preferably, the reaction is carried out by boiling the reaction mixture under reflux conditions.

The quantities of the reactants utilized may also be varied over a substantial range. Since the reaction between the sulfanilamide derivative and the dicarboxylic acid anhydride is substantially quantitative, it is preferred that approximately equimolecular proportions of these reactants be utilized. In excess of a one molecular proportion of the dicarboxylic acid anhydride for each one molecular proportion of the sulfanilamide derivative may be utilized if desired without deleteriously affecting the course of the reaction, and the excess removed and/or recovered in subsequent purification procedures.

In carrying out this reaction, the quantity of ketone utilized as the reaction medium may also be varied considerably. It is not necessary that the reactants be completely in solution as it is sufficient if enough ketone is present in the reaction mixture to provide a mixture of the reactants which is fluid at the reaction temperatures and capable of proper agitation.

In carrying out the novel process of this invention, any $N^1$-acylsulfanilamide, wherein the acyl derivative is derived from an aliphatic substituted or unsubstituted monocarboxylic acid, may be utilized. Typical of such derivatives are the $N^1$-acetylsulfanilamide, $N^1$-propionylsulfanilamide, $N^1$-valerylsulfanilamide, $N^1$-phenylacetylsulfanilamide, $N^1$-chloroacetylsulfanilamide. Similarly any of the dicarboxylic acid anhydrides may be utilized in the novel process of this invention. Typical of such anhydrides are the anhydrides of maleic acid, succinic acid, gamma-ketopimelic acid, sebacic acid, phthalic acid, chlorophthalic acid, etc.

After the reaction as above described is complete, the desired 4-acylsulfamyl derivative of the anilic acid may be recovered from the reaction mixture by any method well known to those skilled in the art. Preferably, the desired derivative is recovered by first removing the ketone solvent, diluting the reaction mass thus obtained with water, and then filtering it to recover the desired derivative which may then be further purified if desired.

What is claimed is:

1. In a process for the preparation of 4-(acylsulfamyl) derivatives of anilic acids, the step comprising reacting an $N^1$-acylsulfanilamide, wherein the acyl radical is derived from a monocarboxylic acid by the removal of the hydroxyl group, said monocarboxylic acid being selected from the group consisting of saturated alkyl monocarboxylic acids containing 2 to 5 carbon atoms inclusive and phenylacetic acid, and a dicarboxylic acid anhydride selected from the group consisting of the anhydrides of saturated alkyl dicarboxylic acids containing 4 to 10 carbon atoms inclusive, maleic acid, gamma-ketopimelic acid, phthalic acid and chlorophthalic acid in a ketone selected from the group consisting of acetone and 2-butanone.

2. In a process for the preparation of 4'-(acetylsulfamyl) phthalanilic acid, the step comprising reacting an $N^1$-acetylsulfanilamide and phthalic anhydride in a ketone selected from the group consisting of acetone and 2-butanone.

3. The process as described in claim 2 wherein the ketone is acetone.

4. In a process for the preparation of 4-(acetylsulfamyl) succinanilic acid, the step comprising reacting an $N^1$-acetylsulfanilamide and succinic anhydride in a ketone selected from the group consisting of acetone and 2-butanone.

5. The process as described in claim 4 wherein the ketone is acetone.

6. In a process for the preparation of 4-(acylsulfamyl) derivatives of anilic acids, the step comprising reacting an $N^1$-acylsulfanilamide, wherein the acyl radical is derived from a monocarboxylic acid by the removal of the hydroxyl group, said monocarboxylic acid being selected from the group consisting of saturated alkyl monocarboxylic acids containing 2 to 5 carbon atoms inclusive and phenylacetic acid, and a dicarboxylic acid anhydride selected from the group consisting of the anhydrides of saturated alkyl dicarboxylic acids containing 4 to 10 carbon atoms inclusive, maleic acid, gamma-ketopimelic acid, phthalic acid and chlorophthalic acid in a ketone selected from the group consisting of acetone and 2-butanone while boiling the reaction mixture under reflux conditions.

7. In a process for the preparation of 4-(acylsulfamyl) derivatives of anilic acids, the step comprising reacting a one molecular proportion of $N^1$-acylsulfanilamide, wherein the acyl radical is derived from a monocarboxylic acid by the removal of the hydroxyl group, said monocarboxylic acid being selected from the group consisting of saturated alkyl monocarboxylic acids containing 2 to 5 carbon atoms inclusive and phenylacetic acid, and approximately a one molecular proportion of a dicarboxylic acid anhydride selected from the group consisting of the anhydrides of saturated alkyl dicarboxylic acids containing 4 to 10 carbon atoms inclusive, maleic acid, gamma-ketopimelic acid, phthalic acid and chlorophthalic acid in a ketone selected from the group consisting of acetone and 2-butanone, while boiling the reaction mixture under reflux conditions.

8. In a process for the preparation of 4'-(acetylsulfamyl) phthalanilic acid, the step comprising reacting a one molecular proportion of $N^1$-acetylsulfanilamide and approximately a one molecular proportion of phthalic anhydride in a ketone selected from the group consisting of acetone and 2-butanone, while boiling the reaction mixture under reflux conditions.

9. The process as described in claim 8 wherein the ketone is acetone.

10. In a process for the preparation of 4-(acetylsulfamyl) succinanilic acid, the step comprising reacting a one molecular proportion of $N^1$-acetylsulfanilamide and approximately a one molecular proportion of succinic anhydride in a ketone selected from the group consisting of acetone and 2-butanone, while boiling the reaction mixture under reflux conditions.

11. The process as described in claim 10 wherein the ketone is acetone.

EVAN J. YOUNG.

References Cited in the file of this patent

FOREIGN PATENTS

| Number | Country | Date |
|---|---|---|
| 557,985 | Great Britain | Dec. 14, 1943 |
| 595,018 | Great Britain | Nov. 25, 1947 |

OTHER REFERENCES

Sikdar et al.: "J. Indian Chem. Soc.," vol. 22 (1945), p. 345.

Basu et al.: "J. Indian Chem. Soc.," vol. 27 (Aug. 1950), p. 397.